United States Patent [19]  [11] 4,306,306
Saenz  [45] Dec. 15, 1981

[54] AMPLITUDE TILT AND NOTCH COMPENSATION APPARATUS

[75] Inventor: Eliseo Saenz, Garland, Tex.

[73] Assignee: Rockwell International Corporation, El Segundo, Calif.

[21] Appl. No.: 106,133

[22] Filed: Dec. 21, 1979

[51] Int. Cl.³ .............................................. H03H 7/30
[52] U.S. Cl. ........................................ 375/14; 333/18; 455/311
[58] Field of Search ............... 329/110, 112, 140, 141; 333/17 M, 18; 375/12, 14, 48, 89, 100; 455/205, 415, 132, 311; 179/170.2

[56] References Cited

U.S. PATENT DOCUMENTS

| | | | |
|---|---|---|---|
| 2,878,317 | 3/1959 | Evans, Jr. | 333/18 |
| 3,011,135 | 11/1961 | Stump et al. | 333/18 |
| 3,341,782 | 9/1967 | Aemmes | 329/112 |

Primary Examiner—Benedict V. Safourek
Attorney, Agent, or Firm—Bruce C. Lutz; Howard R. Greenberg; H. Fredrick Hamann

[57] ABSTRACT

Circuitry is disclosed for detecting signal amplitudes of a signal which is phase indicative of a digital logic level and providing a feedback signal for use in amplitude adjusting the signal to have a substantially zero slope over the relevant frequency bandwidth and zero notch in the middle of the band. The compensation is obtained by applying a voltage to variable impedance pin diodes which form part of a reactive load circuit.

2 Claims, 10 Drawing Figures

RELATIVE IMPEDANCE TABLE

| $R_{49}$ (OHMS) | $|Z_1|$ AT 60 MHZ (OHMS) | $|Z_1|$ AT 80 MHZ (OHMS) | $\dfrac{|Z_1| \; 80 \text{ MHZ}}{|Z_1| \; 60 \text{ MHZ}}$ (OHMS) | SLOPE |
|---|---|---|---|---|
| 25 | 95.50 | 136.00 | 1.42 | + |
| 50 | 106.66 | 145.00 | 1.36 | + |
| 100 | 142.22 | 176.00 | 1.24 | + |
| 200 | 231.80 | 257.00 | 1.11 | + |
| 300 | 322.70 | 337.00 | 1.04 | + |
| 400 | 403.40 | 403.40 | 1.00 | 0 |
| 500 | 474.60 | 455.00 | 0.960 | − |
| 600 | 535.00 | 495.00 | 0.925 | − |
| 700 | 586.00 | 527.00 | 0.890 | − |
| 800 | 628.00 | 550.00 | 0.875 | − |
| 1000 | 692.00 | 584.00 | 0.845 | − |

AMPLITUDE TILT AND NOTCH COMPENSATION APPARATUS

THE INVENTION

The present invention is generally related to electronics and more specifically related to the transmission and reception of alternating waveform variable phase signals indicative of digital logic levels.

It is known in the prior art that multipath interference can cause a notch in the envelope of the band of received signals as detected in a microwave receiver if the interfering signal is 180 degrees out-of-phase with respect to the incident signal. A multipath condition can also cause the envelope amplitude of signals in a given RF spectrum used to transmit the information to tilt in the microwave receiver if the interfering signal is at a phase angle with respect to the incident signal some value other than 180 degrees. For conditions to be corrected by the slope correction portion of the invention, the multipath interference was largest where the multipath received signal ranged from 155 degrees to 205 degrees with respect to the incident signal.

It has also been determined that whenever the envelope amplitude of the signals comprising the RF spectrum under consideration as received by a digital radio is tilted, the tilt causes a degradation in the bit error rate performance of the radio receiver system. In fact, the bit error rate performance degrades very rapidly as the signal amplitude of the received spectrum of signals is tilted. A notch within the bandpass will also cause a degradation of bit error rate performance, although not as severe as a tilt. Although it would be assumed that limiting the amplitude of the signals would correct the problem, it has been determined that such limiters cannot be used in digital radios because they degrade the bit error rate performance even more.

Some of the above determinations as well as general information on the effective selective fading on digital radio receiver performance is outlined in a paper given by Bell-Northern Research of Ottawa, Canada, and authored by C. W. Anderson et al., entitled, "The Effect of Selective Fading on Digital Radio". This paper may be found in the 1978 *IEEE International Communications Conference* and presented on pages 33.5.1 through 33.5.6 in the conference report. While this article indicates that adaptive linear amplitude equalizing is necessary to combat multipath interference, no indication is provided therein as to how such might be accomplished. The present invention solves that problem of tilt due to multipath interference and also the problem of a "notch" in the envelope. Specifically, a notch at the center of the band of received signals (i.e., 70 megahertz in the embodiment shown).

Since the subject matter of the present invention was to operate in a radio in the gigahertz region, the present circuit was designed to be used in the IF stage immediately after the input signal was mixed with a local oscillator and prior to being demodulated. Three detectors are used to obtain an indication of the amplitude of the IF spectrum at different frequencies within the desired band or spectrum of signal frequencies. The relative amplitudes of the detected signals at the two ends of the frequency spectrum are then algebraically summed to provide a composite signal indicative in polarity and magnitude of slope of the IF spectrum. This resultant signal is used to control the impedance of a tunable circuit so as to alter the amplitude of the various frequency signal components by different amounts to obtain a substantially constant amplitude over the range of frequencies involved in the IF spectrum. The detector tuned at the center of the spectrum is used to sense the presence of a notch and to feed back a signal to a bandpass variable Q notch compensator. In the present invention, the slope compensation portion of the above-referenced circuit comprises a pair of variable Q tuned circuits which are variable in Q as a result of pin diodes used to provide the variable resistance. The variable resistance, as known to those skilled in the art, is obtained by varying the voltage across the pin diodes. By using these variable Q circuits in combination with amplifiers whose gain decreases with increasing frequency, and having the center frequency of the tuned circuits be on the high side of the band of frequencies to be passed (i.e., higher than 80 megahertz) both positive and negative tilts can be compensated over the bandpass range of frequencies. In addition to this, the invention includes a narrow band detector tuned to the center of the IF spectrum (70 megahertz as illustrated), which checks for the presence of a notch at midband. This detector provides the control signal for a variable Q bandpass filter also tuned at midband which is used to compensate for a notch specifically at midband.

The above concept will operate at any frequency and the only limitation is state of the art components necessary to implement the function.

It is therefore an object of the present invention to provide amplitude tilt and notch compensation for an alternating signal over the frequencies involved in said spectrum.

Another object of the present invention is to reduce multipath interference effects on received signals as they relate to causation of bit error rate performance degradation in digital radio receivers.

Other objects and advantages of the present invention may be ascertained from a reading of the specification and appended claims in conjunction with the drawings wherein:

Figure 2:
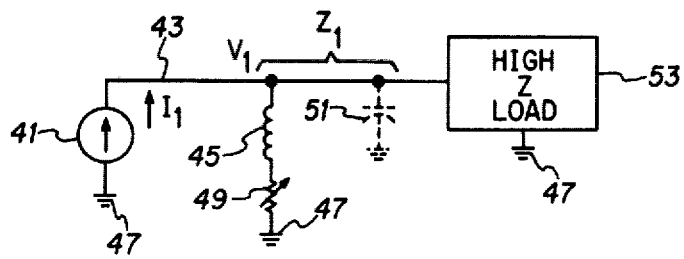
FIG. 2 is an illustrative circuit diagram for use in explaining the operation of the voltage tunable frequency sensitive load circuit used in the AGC amplifier.
Figure 3:
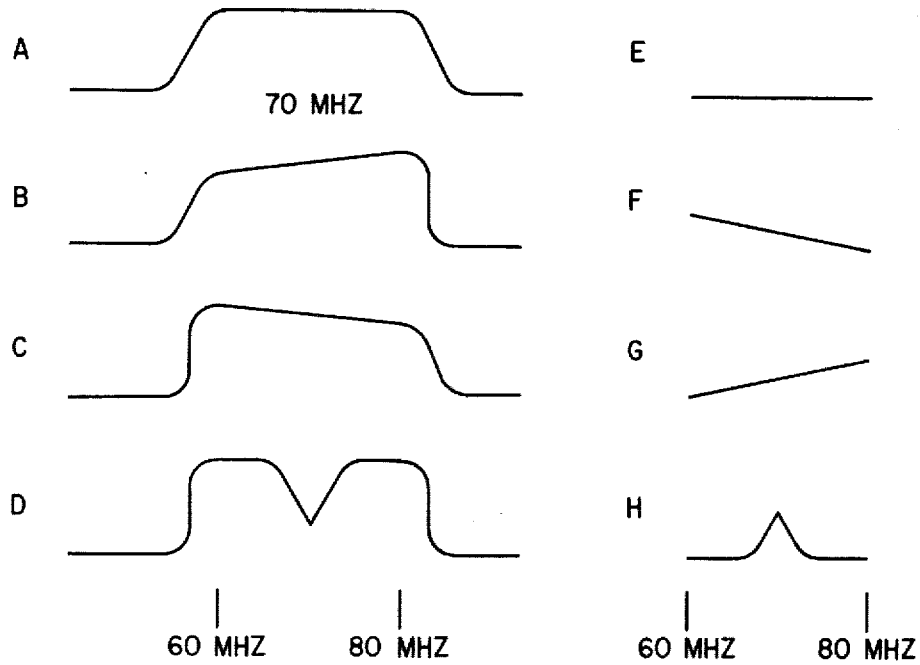
Figures 4, 5:
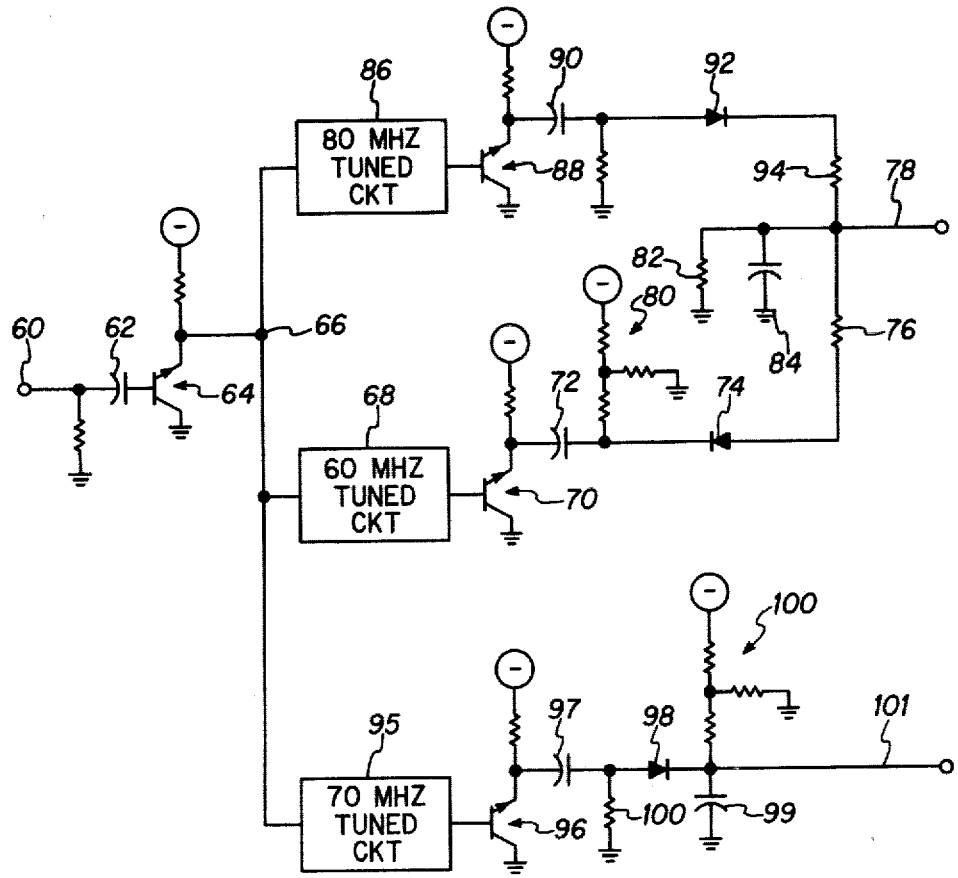
Figure 6A:
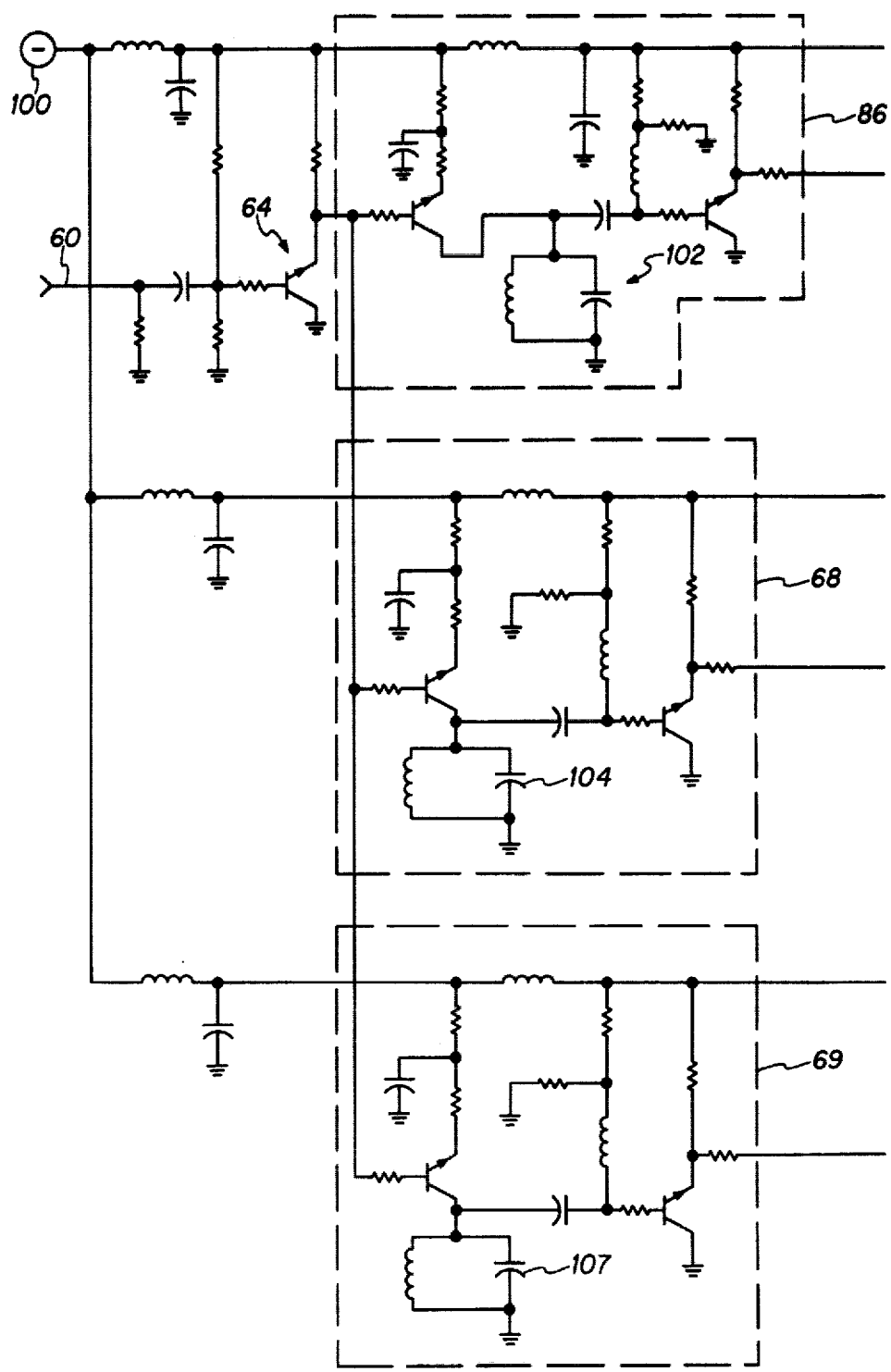
Figure 6B:
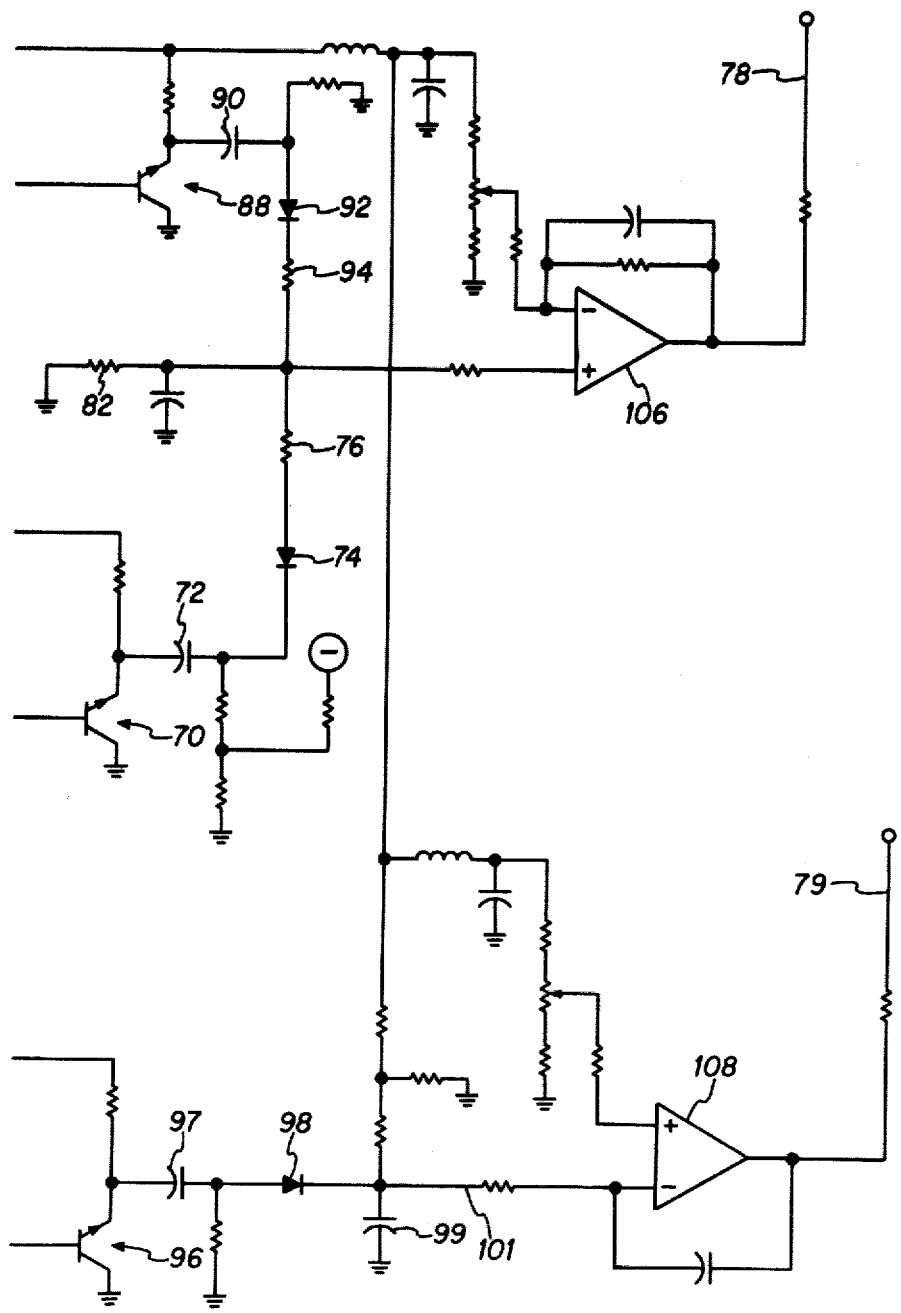
Figure 7A:
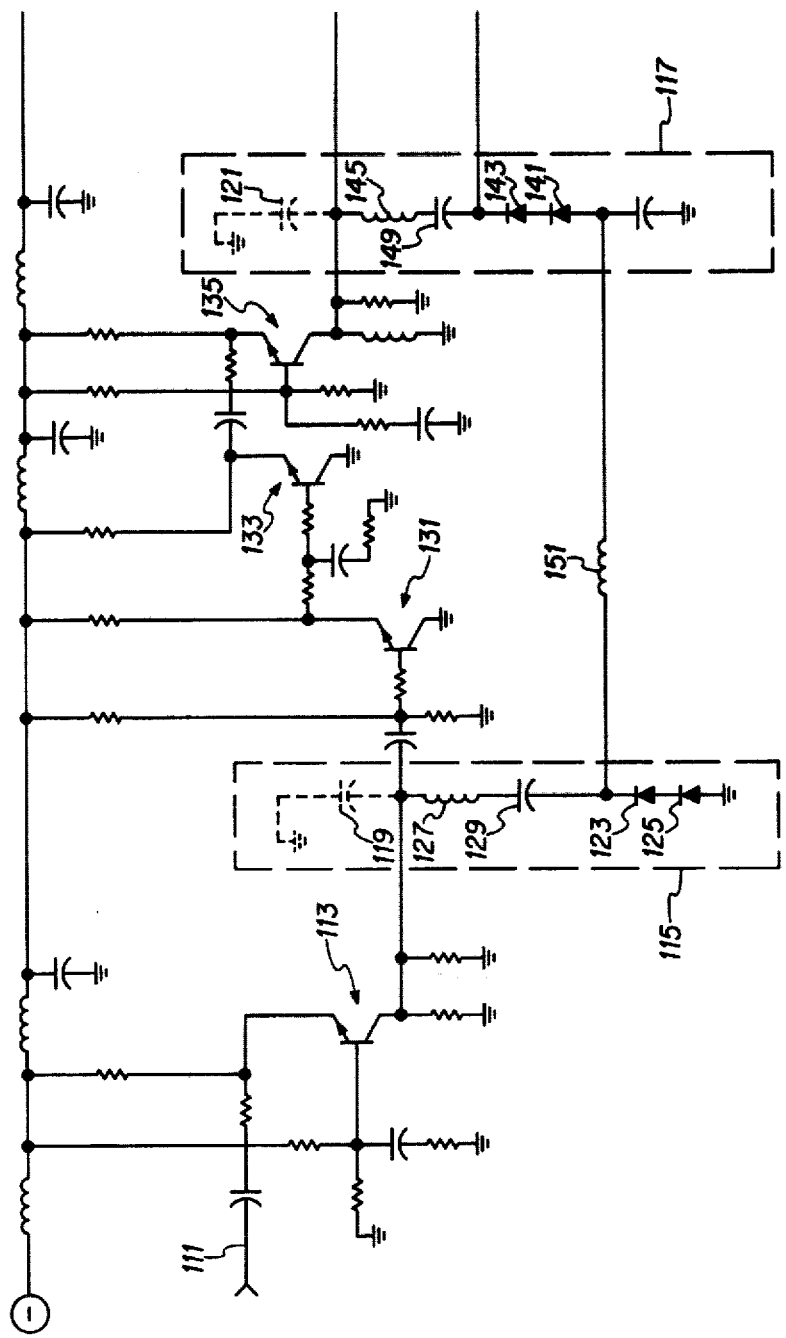
Figure 7B:
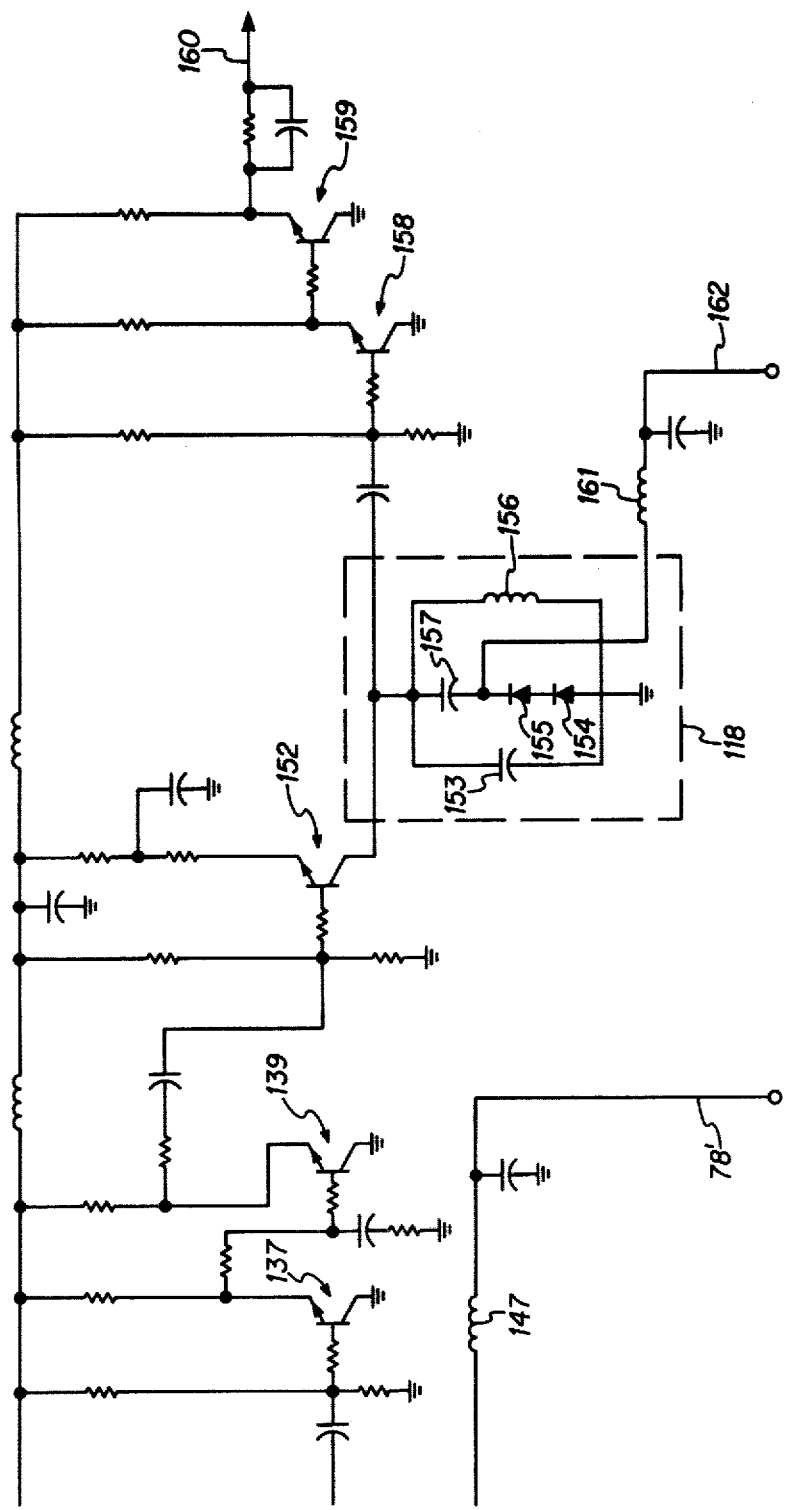
Figure 8:
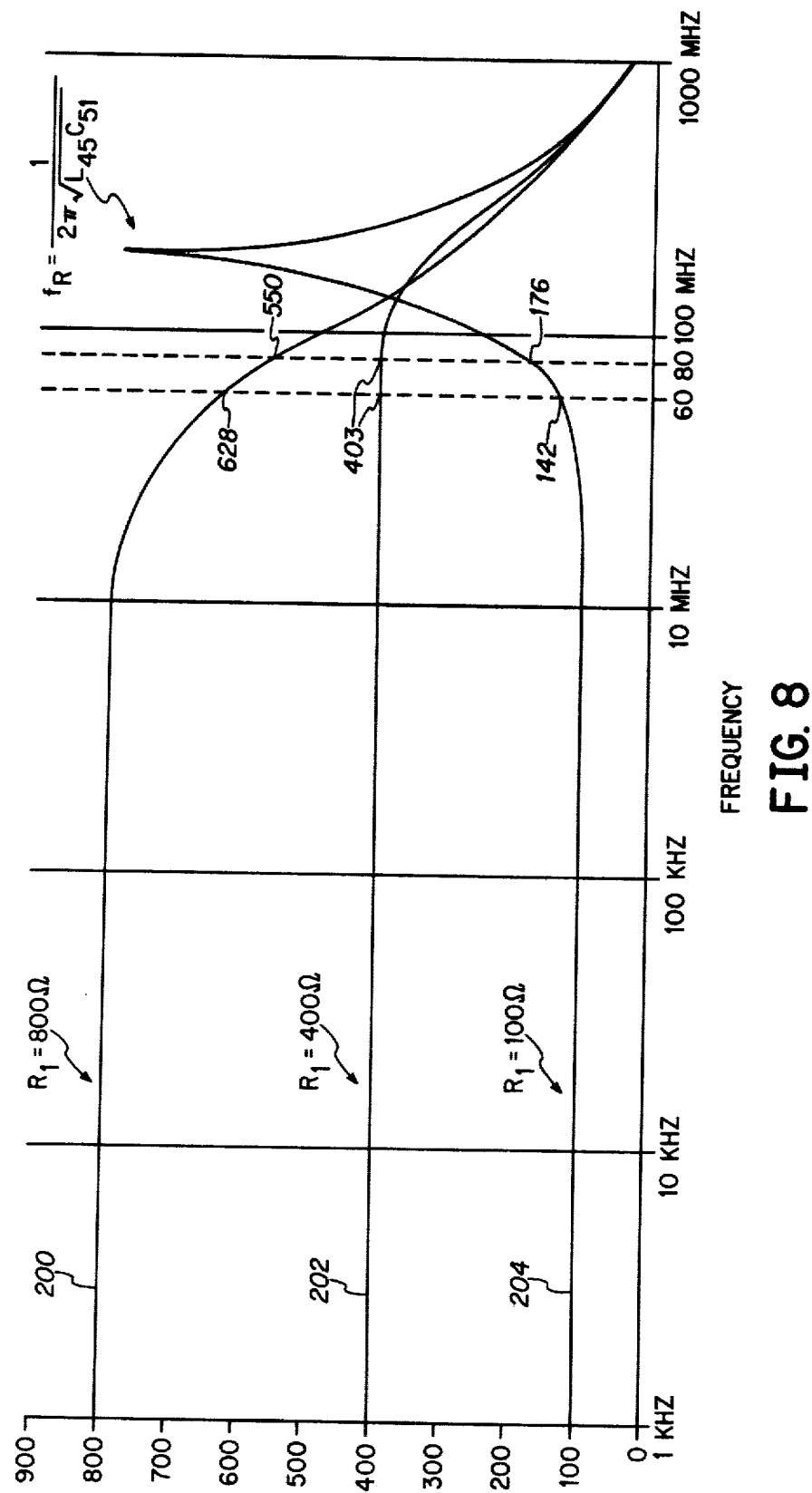

FIG. 3 including waveforms A through H is used in explaining the operation of the invention;

FIG. 4 provides a chart showing the resulting amplitude slope from various signal inputs and resulting impedances in one embodiment of the invention;

FIG. 5 is a block and schematic diagram of the detectors and algebraic summation portion of the inventive concept;

FIGS. 6a and 6b provide a detailed schematic diagram of the circuitry alluded to in FIG. 5;

FIGS. 7a and 7b provide a detailed schematic diagram of the adaptive equalizer amplifier and tunable load portion of the invention; and FIG. 8 provides illustrative waveforms for use in explaining the actions occurring in the circuit of FIG. 2.

DETAILED DESCRIPTION

Figure 1:
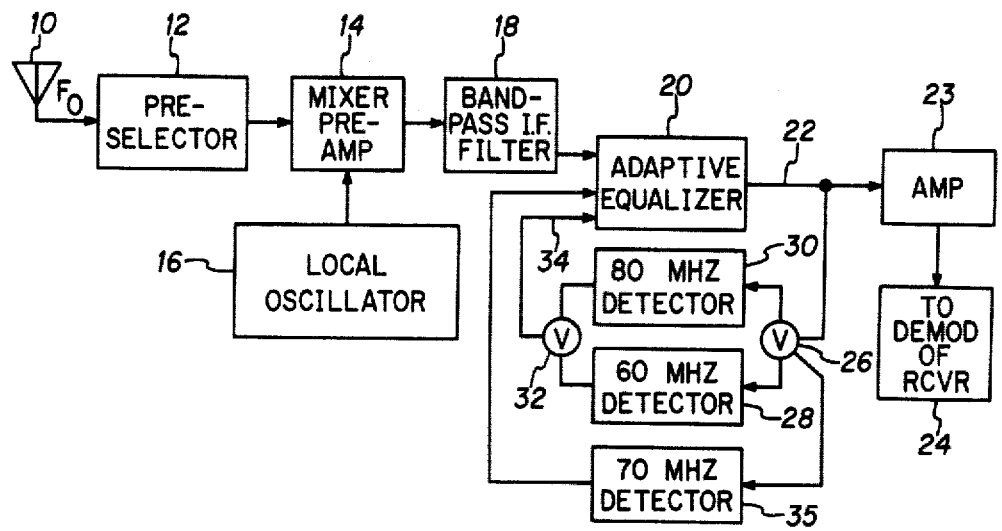
FIG. 1 is a block diagram of the overall inventive concept as utilized in a digital radio receiver.

In FIG. 1, an antenna 10 supplies RF signals to a preselector 12 which supplies signals to a mixer and preamplifier 14. A local oscillator 16 also supplies signals to the mixer 14 wherein the incoming and the local oscillator signal are mixed to provide an output IF signal to a bandpass IF filter 18. In one embodiment of the invention, the IF signal generated by the mixer 14 was 70 megahertz with a 20 megahertz spectrum or band of frequencies. The bandpass filter 18 is designed to pass only the 20 megahertz spectrum from 60 to 80 megahertz and to remove the rest of the signals generated by mixer 14. The 20 megahertz IF spectrum is then passed to a combination adaptive amplitude equalizer and amplifier 20 whose output is supplied on a lead 22 to an AGC amplifier 23 and then to a demodulator in the remaining part of the digital receiver as indicated in a block 24. As may be realized, the AGC function can be incorporated within equalizer block 20 to obtain circuit economies. However, circuit complexity increases thereby hindering an explanation and understanding of the inventive concept. The signals on lead 22 are also passed to a signal dividing circuit 26 wherein the signals are passed to each of three detectors 28, 30 and 35. Detector 28, as illustrated, is a 60 megahertz narrow band detector while detector 30 is an 80 megahertz narrow band detector and detector 35 is a 70 megahertz narrow band detector. The detected signals from detectors 28 and 30 are summed in a summing device 32 to provide as a resultant an algebraic sum on a lead 34 which is input to amplifier 20. As explained elsewhere, the voltage appearing on lead 34 affects a pair of tuned circuits which provide different impedances for different frequencies so that signals passing through amplifier 20 are affected differently for different frequencies. Thus, the detectors 28 and 30 act as a feedback device to change the signal received by amplifier 20 from bandpass filter 18 from that having an amplitude variation over the indicated spectrum to a set of signals having substantially no amplitude variation over the desired spectrum. The detector 35 checks for the presence of a notch in the center of the band. The output of detector 35 supplies a DC signal or current which controls the Q of a bandpass filter contained in the adaptive equalizer block 20 to thereby compensate for a notch in the center of the band.

In FIG. 2, a current or signal source is illustrated as 41 and supplies current ($I_1$) on a lead 43 to an inductance 45. The source 41 is connected between lead 43 and ground 47. A variable resistance designated as 49 is connected between inductance 45 and ground 47. A capacitive device 51, as illustrated, is also connected between lead 43 and ground 47. Together 45, 49 and 51 form an impedance $Z_1$, across which a voltage $V_1$ is developed. A high impedance load 53 is connected to the lead 43 also and is effectively connected between lead 43 and ground 47.

In FIG. 3, an idealized waveform is shown of the envelope of an IF spectrum or band of signals as obtained from the bandpass filter 18 by amplifier 20. The waveforms B and C in FIG. 3 illustrate the effect of a multipath interference signal being approximately 155 and 205 degrees with respect to the incident signal respectively. In waveform E of FIG. 3, it is illustrated that no compensation is required with a substantially flat waveform A as shown in FIG. 3. On the other hand, waveform F of FIG. 3 illustrates that negative slope compensation is required to correct the amplitude envelope of waveform B while waveform G shows a positive slope compensation for correcting waveform C.

The waveforms of E, F and G of FIG. 3 are representative of the low frequency side of the impedance variation caused by the tuned circuits 115 and 117 of FIG. 7 which effectively cause a change in gain with frequency in the amplifiers associated with the tuned circuits. Thus, as the resistance presented by the pin diodes changes, the change in impedance with frequency (the Q of the circuit) changes and alters the amount of current flowing into the load thereby changing the response of the circuit to various frequency components of the signal over the desired bandwidth of 60 to 80 megahertz. Waveform D shows the effect of multipath interference at 180 degrees. It shows up as a notch at 70 megahertz with the depth being proportional to the relative level or amplitudes of the multipath signals to the first received or incident signal level. Waveform H shows the type of compensation required by amplifier 20 to compensate for the notch. A single tuned bandpass filter with a variable Q element meets the signal modification requirements of waveform H.

FIG. 4 provides five columns which illustrate the effects of various values for resistance 49 on the magnitude of the impedance of $Z_1$ in the circuit of FIG. 2. (FIG. 2 is representative of the circuitry illustrated in FIG. 7a). Each of these values is then calculated for a given inductance (45) and a given capacitance (51) for the frequencies of 60 and 80 megahertz. The magnitudes of $Z_1$ at 60 and 80 megahertz are shown in the second and third columns. Column 4 then illustrates the ratio of impedance $Z_1$ between the 80 megahertz value and the 60 megahertz value. The final column shows whether the slope is positive, negative or zero for each of these values.

In FIG. 5, a detector input terminal 60 supplies signals through a capacitor 62 to an NPN emitter-follower transistor stage generally designated as 64 having its emitter connected to a junction point 66. Junction point 66 is connected through a 60 megahertz tuned detector circuit 68 to an NPN transistor, generally designated as 70, having its emitter connected through a coupling capacitor 72, a rectifying diode 74 and a resistor 76 to an output terminal 78. A biasing circuit is shown generally as 80 and a load resistor 82 is illustrated connected between output terminal 78 and ground 84. The junction point 66 is also connected through an 80 megahertz tuned detector circuit 86 to an NPN transistor generally designated as 88. The emitter of transistor 88 is connected through a coupling capacitor 90, a rectifying diode 92 and a resistor 94 to the output terminal 78. The junction point 66 is also connected through a 70 megahertz tuned detector 95 to an NPN transistor 96 whose emitter is connected through coupling capacitor 97 to detector diode 98. Resistors 100 provide biasing for diode 98 while capacitor 99 provides filtering for the DC output at output terminal 101.

In FIG. 6, the same numbers are used as used in FIG. 5 to designate identical components. Since FIG. 6 is merely a detailed schematic diagram, very little will be added to that previously discussed. However, terminal 100 supplies negative potentials to the circuit and the resonant tank circuits 102, 104 and 107 provide the fine tuning for each of the three filter circuits. The circuit of FIG. 6 also illustrates an amplifier 106 connected as an integrating circuit between the summing junction of resistors 76 and 94 to provide gain and a steady state (slowly varying) output on terminal 78. Another amplifier 108 amplifies the DC voltage from the 70 megahertz detector diode 98 and provides a control signal output to terminal 79.

In FIG. 7, a signal input 111 provides input signals to the first stage of the equalizer as represented by an NPN transistor generally designated as 113. This stage is configured in a common base arrangement and along with its associated resistors and capacitors provides a 75 ohm input impedance to a circuit 115 indicated in dash lines. Circuit 115, as well as associated circuit 117, accomplishes essentially the function outlined in connection with the circuit of FIG. 2. The capacitor designated as 119 and similar capacitor 121 are actually stray capacitance obtained in the design of the circuit. The circuit 115 additionally contains two pin diodes 123 and 125 which provide the function of the variable resistance 49 in FIG. 2 while an inductance 127 provides the same effect as inductor 45 of FIG. 2. A capacitor shown as 129 is used merely for direct voltage isolation and does not perform any significant part in the tuning operation. NPN transistors generally designated as 131 and 133 are connected in an emitter-follower configuration to provide a high impedance load to the tunable load circuit of 115. These emitter-follower stages also provide matching to the following stages of the circuit comprising NPN transistors 135, 137 and 139 which operate respectively in a manner similar to that of transistors 113, 131 and 133. As will be noted, tuning circuit 117 also contains a pair of pin diodes which have been designated as 141 and 143 and an associated inductance 145. Further, an inductance 147 connects the feedback input 78' to a junction between pin diode 143 and a capacitor 149 while a further inductor 151 connects the anode of pin diode 141 to the cathode of pin diode 123 in tunable circuit 115. The signal processing stages comprising transistors 137 and 139 act to provide an impedance match into a notch compensator or variable Q bandpass circuit 118. A transistor 152 is configured in the common emitter mode and provides a high source impedance of circuit 118 which is comprised of tank circuit resonant elements including a capacitor 153 and an inductor 156. The Q of the circuit is controlled by the variable impedance of pin diodes 154 and 155. Capacitor 157 is a DC current blocking element. Inductor 161 is a decoupling element and lead 162 is a control signal output line for the variable Q bandpass circuit 118. Transistors 158 and 159 are configured in the common collector mode and provide a 75 ohm output impedance at terminal 160 for application to the associated demodulator 24 as well as to the input 60 of the detector circuit of FIG. 5. Because of physical limitations on the maximum realizable Q's in actual circuits, the maximum tilt that could be obtained from 60 to 80 megahertz was 6 dB for tuned circuit 115. Since more compensation was required for the specifications to be met by the present invention, two filter circuits were used in series to obtain a desired 12 dB maximum slope. Thus, the invention does not require the use of two variable Q tuned circuits as illustrated in FIG. 7a to practice the inventive concept.

The graph of FIG. 8 illustrates on lines 200, 202 and 204, respectively, the impedance $Z_1$ in absolute terms of the circuit of FIG. 2 where the resistance 49 is respectively 800 ohms, 400 ohms and 100 ohms. As will be noted, the impedance values shown in the graph coincide at 60 and 80 megahertz with those given in the table of FIG. 4.

As will be realized from the operation section following, the alternation of relative impedance values at 60 and 80 megahertz above and below the "midpoint" provides the compensation function to compensate for amplitude tilt in the incoming signal.

OPERATION

Referring now to FIG. 2, it may be noted that this circuit provides the control amplitude slope characteristic required by the inventive concept. As indicated elsewhere, the variable resistance 49 is achieved in function by the pin diodes such as 123 and 125 in FIG. 7a. The current source 41 in FIG. 2 represents the source impedance presented by the collector of transistor 113. The input impedance of transistor 131 represents the high impedance load illustrated as 53 in FIG. 2. The signal voltage $V_1$ equals the current $I_1$ times the total impedance $Z_1$ provided by the components 45, 49 and 51. Since by design the current $I_1$ is constant, then $V_1$ is directly proportional to $Z_1$. The impedance formed by these components is described by the equations below.

$$Z_1 = \frac{R_{49} + j\omega L_{45}}{1 - \omega^2 L_{45} C_{51} + j\omega R_{49} C_{51}} \quad (1)$$

$$|Z_1| = \frac{\sqrt{(R_{49})^2 + (\omega L_{45})^2}}{\sqrt{(1 - \omega^2 L_{45} C_{51})^2 + (\omega R_{49} C_{51})^2}} \quad (2)$$

Where
$R_{49}$ = Resistor 49
$L_{45}$ = Inductance 45
$C_{51}$ = Capacitor 51

The table set forth in FIG. 4 shows a tabulation of the magnitude of the impedance of equation 2 at different frequencies as a function of $R_{49}$. The table also shows the ratio of the magnitude of $Z_1$ at 80 megahertz and 60 megahertz respectively. The magnitude of $Z_1$ is therefore directly proportional to the amplitude response $V_1$. Thus, when the ratio of the impedance at 80 megahertz to the impedance at 60 megahertz is equal to one, it represents no slope to the response. A ratio greater than one represents a positive slope and a ratio less than one represents a negative slope. The table shows that when $R_{49}$ equals 400 ohms, $L_{45}$ is 0.22 microhenry's and $C_{51}$ is 3 picofarads, the slope is equal to zero. When $R_{49}$ becomes greater than 400 ohms, the slope is negative and when $R_{49}$ is less than 400 ohms, the slope is positive. As realized by those skilled in the art, the circuit 115 in FIG. 7 accomplishes the results of FIG. 2 by varying the voltage applied to the two pin diodes. These diodes have a resistance value which varies or changes directly with bias current and thus as a function of applied voltage. Circuit 118 in FIG. 7 is a bandpass, parallel resonant circuit. The resonant frequency is 70 megahertz. The pin diodes in the circuit are connected across the tank circuit and consequently control the Q of the circuit. Thus, by varying the DC control current into lead 162, the resistance of the pin diodes 154 and 155 will vary and the Q of circuit 118 will vary. Thus, the voltage developed at the collector of transistor 152 at 70 megahertz can be varied from a low value when the Q of 118 is low to a high value, when the Q is high, the amplitude versus frequency response of circuit 118 is shown in waveform H of FIG. 3.

The detectors 28, 30 and 35 of FIG. 1 are shown in somewhat more detail in FIG. 5. In the embodiment illustrated, a spectrum of signals is used from 60 to 80 megahertz with 70 megahertz being a center frequency. It is desirable that the entire spectrum of signals between these frequency extremes (usable band of frequencies) have substantially the same amplitude as the signal has at 70 megahertz. The circuit will provide compensation when the multipath interference is exactly 180 degrees out-of-phase with the incident signal, and it will provide satisfactory compensation for other phases on either side of 180 degrees phase difference. As illustrated, the signal input on lead 60 is passed through an isolation amplifier comprising transistor 64 to each of the tuned circuits 68, 86 and 95. These tuned circuits select only the amplitude at the designated frequency for application through the transistors 70, 88 and 96 to the rectifying circuits comprising diodes 74, 92 and 98. The diode 74 provides a component of negative bias signals across resistor 82 while diode 92 provides positive components of signals across resistor 82. The algebraic summation of these two signals provides an output on terminal 78 which is indicative in amplitude of the ratio of the amplitudes at 60 and 80 megahertz and in polarity as to whether the 80 megahertz signal is higher or lower than the 60 megahertz signal.

As will be realized, the terms positive and negative polarity are relative terms only since the biasing circuit 80 assures that the output terminal 78 will always be negative. This quiescent negative voltage then becomes more negative or less negative for the two slopes. In other words, if the amplitude of the signal at 80 megahertz is higher than the signal at 60 megahertz, the slope is designated as positive and the signal becomes less negative or nearer to ground. On the other hand, if the 80 megahertz signal is of a lower amplitude than that detected at 60 megahertz, the slope is designated as negative and the voltage at terminal 78 is more negative than it would be at the zero slope or quiescent condition. If there is a notch in the received signal at the center of the band, diode 98 (in FIG. 4 or 6b) provides a positive voltage across capacitor 99 which is indicative of the depth of a notch occurring at 70 megahertz.

Referring now to FIGS. 6a and 6b, it will be noted that there is merely more detail as compared to FIG. 5. It may be noted, however, that the emitter-follower transistor stage 64 provides a 75 ohm input impedance and provides a low source impedance to drive the three detectors 68, 86 and 69. The resonant circuits 102, 104 and 107 form parallel tank circuits and are driven by the high collector source impedance of the transistors whose collectors are connected thereto. The following transistor in each of these filter circuits provides a high impedance due to the emitter-follower configuration and the large emitter resistors used therewith.

Referring now to FIG. 1 along with the detailed diagrams just described, it will be realized that the adaptive equalizer 20 and the slope and notch detectors operate in a closed loop arrangement. The detectors comprising blocks 28, 30 and 35 have to be located at the output of the amplitude equalizer to operate satisfactorily. As the amplitude tilt compensation occurs, the absolute level at 70 megahertz changes, therefore, automatic gain control is required between the output of the amplitude equalizer and the receiver. Thus, in one embodiment of the invention, the amplitude slope equalizer circuit is integrated into an AGC amplifier IF circuit as shown in FIG. 7 to minimize parts and economize on cost.

As previously indicated, the two filter circuits 115 and 117 of FIG. 7 operate in series to provide a maximum compensating gain variation in frequency of 12 dB over the 60 to 80 megahertz range. Since the amplifier was designed to have a negative slope of gain with frequency variation over the desired frequency band of interest (or in other words, when the pin diodes would be at their maximum impedance level), a given value of control signal would of necessity be input of lead 78' in order to lower the resistance value of the diode to that necessary to obtain zero variation in gain through the circuit over the frequency band. The notch compensator 118 can correct for a maximum notch of 12 dB at 70 megahertz.

I therefore wish to be limited not by the specific embodiment illustrated herein but only by the scope of the appended claims.

I claim:

1. Slope and notch detection apparatus comprising, in combination:
   input means, including feedback means, for receiving and passing a spectrum of signals with the spectrum having a predetermined intermediate frequency;
   first filter means, connected to said input means, for outputting a first polarity signal indicative of the amplitude of input signals at a first frequency on one side of said intermediate frequency;
   second filter means, connected to said input means in parallel with said first filter means, for outputting a second polarity signal indicative of the amplitude of input signals at a second frequency on the other side of said intermediate frequency;
   summing means, connected to said first and second filter means, for outputting a signal indicative in polarity and amplitude of the slope of the input spectrum of signals;
   third filter means for detecting a notch in the center of the bandpass spectrum of signals being passed by said input means and outputting a signal indicative of the detected notch; and
   means connecting said summing means and said third filter means to said feedback means of said input means for supplying signals thereto indicative of slope and notch.

2. Digital signal adaptive equalizer apparatus for compensation of slope and notch over a given band of frequencies caused by multipath signal interference comprising, in combination:
   controllable Q filter first means including first control input means wherein maximum Q occurs at a frequency outside of and higher than said band of frequencies;
   controllable Q filter second means including second control means wherein maximum Q occurs at a frequency approximately the same as the mid-band frequency of said band of frequencies;
   third means connecting said first and second means in series circuit, said third means including apparatus input means and apparatus output means;
   filter type detection fourth and fifth means connected to said apparatus output means, for supplying an output signal to said first control input means indicative in polarity and amplitude of the slope of received signals, said fourth and fifth means detecting signals at high and low frequencies respectively within said given band of frequencies; and
   filter type detection sixth means for detecting notch at the center of said band of frequencies and providing an output signal to said second control input means, the Q adjustment of said first and second means altering the slope and notch of signal amplitudes whereby signals appearing at said apparatus output means have substantially no amplitude variations.

* * * * *